(12) United States Patent
Ionita

(10) Patent No.: US 9,805,279 B2
(45) Date of Patent: *Oct. 31, 2017

(54) METHODS AND SYSTEMS FOR DETERMINING USER LIVENESS

(71) Applicant: Daon Holdings Limited, George Town (KY)

(72) Inventor: Mircea Ionita, Dublin (IE)

(73) Assignee: DAON HOLDINGS LIMITED, George Town (KY)

( * ) Notice: Subject to any disclaimer, the term of this patent is extended or adjusted under 35 U.S.C. 154(b) by 30 days.

This patent is subject to a terminal disclaimer.

(21) Appl. No.: 15/053,111

(22) Filed: Feb. 25, 2016

(65) Prior Publication Data

US 2016/0171324 A1    Jun. 16, 2016

Related U.S. Application Data

(62) Division of application No. 14/053,384, filed on Oct. 14, 2013, now Pat. No. 9,305,225.

(51) Int. Cl.
| | |
|---|---|
| *G06K 9/00* | (2006.01) |
| *G06K 9/46* | (2006.01) |
| *G06K 9/52* | (2006.01) |
| *G06T 7/60* | (2017.01) |
| *G06T 7/73* | (2017.01) |

(52) U.S. Cl.
CPC ....... *G06K 9/00906* (2013.01); *G06K 9/0061* (2013.01); *G06K 9/00604* (2013.01); *G06K 9/00617* (2013.01); *G06K 9/4614* (2013.01); *G06K 9/52* (2013.01); *G06T 7/60* (2013.01); *G06T 7/73* (2017.01); *G06K 2009/00966* (2013.01); *G06K 2009/4666* (2013.01); *G06T 2207/30196* (2013.01)

(58) Field of Classification Search
CPC ............. G06K 9/00597–9/00617; G06K 9/00899–9/00906
USPC ........................ 382/117, 118, 205
See application file for complete search history.

(56) References Cited

U.S. PATENT DOCUMENTS

| | | | |
|---|---|---|---|
| 6,429,875 | B1 | 8/2002 | Pettigrew et al. |
| 8,280,120 | B2 | 10/2012 | Hoyos et al. |
| 8,369,595 | B1 | 2/2013 | Derakhshani et al. |

(Continued)

FOREIGN PATENT DOCUMENTS

| | | |
|---|---|---|
| WO | WO 2011/028023 A2 | 3/2011 |
| WO | WO 2011/028023 A3 | 3/2011 |

OTHER PUBLICATIONS

Pan, et al., "Liveness Detection for Face Recognition," Recent Advances in Face Recognition, Dec. 2008, pp. 109-125.

(Continued)

*Primary Examiner* — Andrew Moyer
*Assistant Examiner* — Narek Zohrabyan
(74) *Attorney, Agent, or Firm* — Kevin McDermott, Esq.

(57) ABSTRACT

A method determining user liveness is provided that includes calculating, by a device, eye openness measures for a frame included in captured authentication data, and storing the eye openness measures in a buffer of the device. Moreover the method includes calculating confidence scores from the eye openness measures stored in the buffer, and detecting an eye blink when a maximum confidence score is greater than a threshold score.

9 Claims, 10 Drawing Sheets

(56) References Cited

U.S. PATENT DOCUMENTS

| | | |
|---|---|---|
| 8,437,513 B1 | 5/2013 | Derakhshani et al. |
| 8,457,367 B1 | 6/2013 | Sipe et al. |
| 8,483,450 B1 | 7/2013 | Derakhshani et al. |
| 8,582,835 B2 | 11/2013 | Cavallini |
| 8,675,925 B2 | 3/2014 | Derakhshani et al. |
| 8,724,857 B2 | 5/2014 | Derakhshani et al. |
| 8,744,141 B2 | 6/2014 | Derakhshani et al. |
| 8,787,628 B1 | 7/2014 | Derakhshani et al. |
| 8,798,336 B2 | 8/2014 | Nechyba et al. |
| 8,958,607 B2 | 2/2015 | Juveneton et al. |
| 9,020,213 B1 | 4/2015 | Ionita |
| 2006/0203088 A1 | 9/2006 | Hammoud et al. |
| 2006/0210121 A1 | 9/2006 | Nakano et al. |
| 2006/0215017 A1 | 9/2006 | Cohen |
| 2009/0219405 A1 | 9/2009 | Kaneda et al. |
| 2012/0002843 A1 | 1/2012 | Yoda |
| 2012/0076418 A1* | 3/2012 | Sasao ................ G06K 9/00308 382/195 |
| 2012/0314047 A1 | 12/2012 | Kasahara et al. |
| 2013/0016882 A1 | 1/2013 | Cavallini |
| 2013/0188840 A1 | 7/2013 | Ma et al. |
| 2014/0037156 A1 | 2/2014 | Cavallini |
| 2014/0044318 A1 | 2/2014 | Derakhshani et al. |
| 2014/0044319 A1 | 2/2014 | Derakhshani et al. |
| 2014/0044320 A1 | 2/2014 | Derakhshani et al. |
| 2014/0044321 A1 | 2/2014 | Derakhshani et al. |
| 2014/0050369 A1 | 2/2014 | Ghuge et al. |
| 2014/0093140 A1 | 4/2014 | Juveneton et al. |
| 2014/0198959 A1 | 7/2014 | Derakhshani et al. |
| 2014/0270405 A1 | 9/2014 | Derakhshani et al. |
| 2014/0294252 A1 | 10/2014 | Derakhshani et al. |
| 2014/0337948 A1 | 11/2014 | Hoyos |
| 2015/0110365 A1 | 4/2015 | Ionita |
| 2015/0139497 A1 | 5/2015 | Juveneton et al. |
| 2015/0205996 A1* | 7/2015 | Ionita ................ G06K 9/00255 382/118 |

OTHER PUBLICATIONS

Viola, et al., "Rapid Object Detection using a Boosted Cascade of Simple Features," IEEE, 2001, pp. I-511 to I-518.

Extended European Search Report dated Apr. 10, 2015 for counterpart EPO Application No. 14182923.4, pp. 1-6.

Grauman et al., "Communication via eye blinks-detection and duration analysis in real time," Computer Vision and Pattern Recognition, 2001, pp. I-1010 to I-1017.

Chau et al., "Real time eye tracking and blink detection with usb cameras," Boston University Computer Science Department, 2005, pp. 1-10.

* cited by examiner

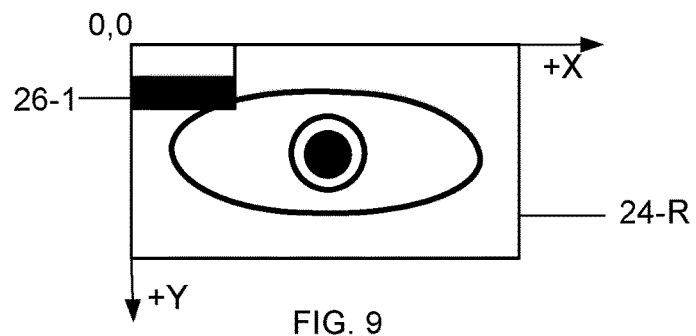
FIG. 9
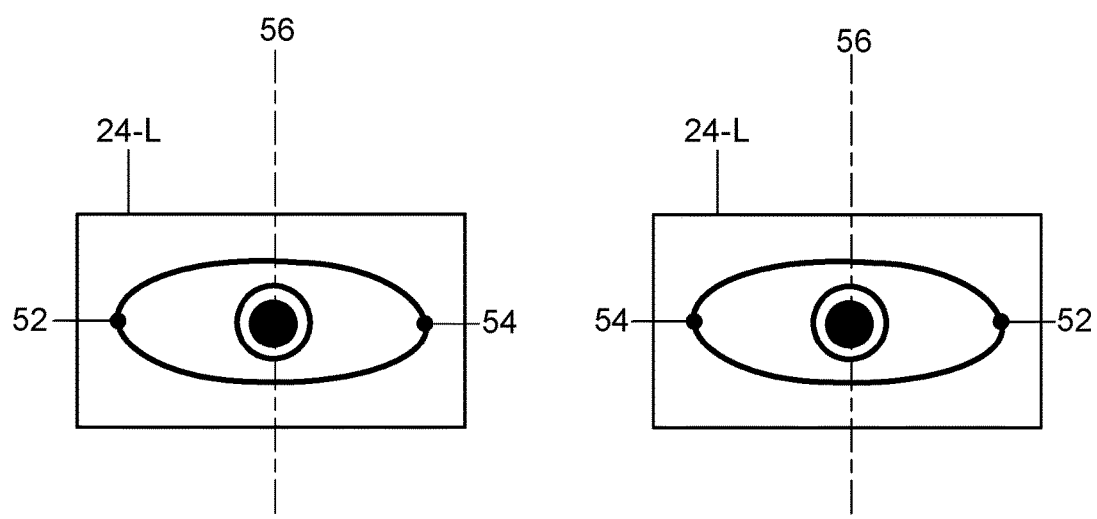
FIG. 10
FIG. 11

58

| Most Relevant Windows | | | | |
|---|---|---|---|---|
| Type | Width | Height | X Coord. | Y Coord. |
| I | 4 | 2 | 5 | 1 |
| I | 4 | 2 | 2 | 2 |
| I | 6 | 3 | 7 | 3 |
| I | 6 | 3 | 3 | 3 |
| II | 4 | 2 | 2 | 3 |
| II | 4 | 2 | 8 | 3 |
| II | 6 | 2 | 5 | 1 |
| II | 6 | 3 | 5 | 4 |
| III | 4 | 2 | 5 | 2 |
| III | 4 | 2 | 8 | 3 |
| III | 6 | 2 | 3 | 3 |
| III | 6 | 3 | 7 | 2 |
| IV | 3 | 4 | 5 | 3 |
| IV | 3 | 4 | 5 | 4 |
| IV | 3 | 3 | 2 | 2 |
| IV | 3 | 3 | 2 | 3 |
| IV | 4 | 4 | 5 | 3 |
| V | 2 | 2 | 5 | 2 |
| V | 3 | 3 | 5 | 3 |
| V | 4 | 4 | 2 | 2 |
| V | 4 | 4 | 8 | 3 |
| V | 2 | 2 | 5 | 1 |

FIG. 12

METHODS AND SYSTEMS FOR DETERMINING USER LIVENESS

CROSS-REFERENCE TO RELATED APPLICATIONS

This is a divisional application of U.S. patent application Ser. No. 14/053,384, filed Oct. 14, 2013, the disclosure of which is incorporated herein by reference.

BACKGROUND OF THE INVENTION

This invention relates generally to determining user liveness, and more particularly, to methods and systems for determining user liveness as the result of detecting user eye blinks.

Users conduct transactions with many different entities in person and remotely over the Internet. Transactions may be network-based transactions for purchasing items from a merchant web site or may involve accessing confidential information from a website remotely over the Internet. Entities that own such websites typically require successfully identifying users as the result of an authentication transaction before permitting users to conduct the transactions.

During remotely conducted network-based authentication transactions, users typically interact with an authentication system to prove their claim of identity. Such interactions generally provide a claim of identity and biometric data captured from the user to the authentication system. However, imposters have been known to impersonate users during authentication transactions by providing a false claim of identity supported by fraudulent biometric data in an effort to deceive an authenticating entity into concluding that the imposter is the person they claim to be. Such impersonations are known as spoofing.

Impostors currently use many methods to obtain or create fraudulent biometric data that can be submitted during authentication transactions. For facial biometric data imposters have been known to obtain two-dimensional pictures of others, from social networking sites, and present the obtained pictures to a camera during authentication to support a false claim of identity. Moreover, imposters have been known to eavesdrop on networks during legitimate network-based authentication transactions to surreptitiously obtain genuine biometric data of users. The imposters then use the obtained biometric data for playback during fraudulent authentication transactions. Such fraudulent biometric data are known to be difficult to detect using known liveness detection methods. Consequently, accurately conducting network-based authentication transactions with biometric data captured from a user at a remote location depends on verifying the physical presence of the user during the authentication transaction as well as accurately verifying the identity of the user based on the captured biometric data. Verifying that the biometric data presented during a network-based biometric authentication transaction conducted at a remote location is from a live person at the remote location, is known as liveness detection or anti-spoofing.

Known methods of liveness detection may not detect spoofing attempts that use high definition video playback to present fraudulent biometric data, and therefore do not provide high confidence liveness detection support for entities dependent upon accurate biometric authentication transaction results.

BRIEF DESCRIPTION OF THE INVENTION

In one aspect, a method for determining user liveness is provided that includes calculating, by a device, eye openness measures for a frame included in captured authentication data, and storing the eye openness measures in a buffer of the device. Moreover the method includes calculating confidence scores from the eye openness measures stored in the buffer, and detecting an eye blink when a maximum confidence score is greater than a threshold score.

In another aspect, a system for determining user liveness is provided that includes a processor and a memory. The memory is configured to store a buffer of eye openness measures. The processor is programmed to calculate eye openness measures for a frame included in captured authentication data, and store the eye openness measures in the buffer. Moreover, the processor is programmed to calculate confidence scores from the eye openness measures stored in the buffer and detect an eye blink when a maximum confidence score is greater than a threshold score.

In yet another aspect, a method for determining detection windows and window positions to be used for calculating feature values during authentication transactions is provided. The method includes incrementally moving at least one detection window type over a region of interest to occupy different positions within the region of interest, and calculating a feature value for each position. Moreover, the method includes creating a vector from the feature values, and determining detection window type, size, and position combinations for calculating feature values during authentication transactions, and determining eye openness measures during authentication transactions with the calculated feature values.

BRIEF DESCRIPTION OF THE DRAWINGS

FIG. 9 is an enlarged plan view of an exemplary region of interest including the exemplary detection window shown in FIG. 4;

FIG. 10 is an enlarged plan view of an exemplary region of interest including a centerline;

FIG. 11 is an enlarged plan view of the exemplary region of interest shown in FIG. 10 flipped about the centerline;

FIG. 12 is a diagram illustrating an exemplary look-up table;

DETAILED DESCRIPTION OF THE INVENTION

Figure 1:
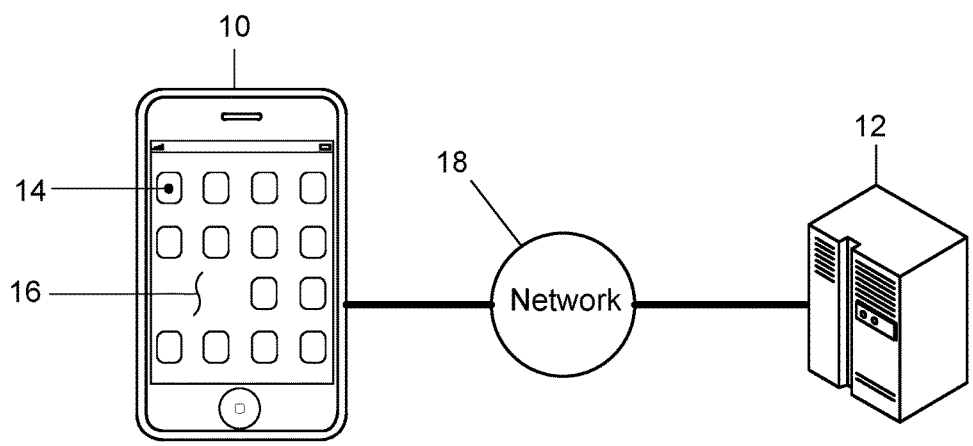
FIG. 1 is a diagram including an exemplary data capture device and an exemplary Liveness Detection Computer System for determining user liveness.

FIG. 1 is a diagram including an exemplary data capture (DC) device 10 and an exemplary Liveness Detection Computer (LDC) System 12 that may be used for determining user liveness during authentication transactions. The DC device 10 is a smart phone that may store applications and data therein, may display at least one of text and images, and is associated with a user. The DC device 10 may include buttons and icons 14 for at least entering commands and invoking applications stored therein, and a display screen 16 such as, but not limited to, a Liquid Crystal Display (LCD) that displays at least one of text and images. Moreover, the DC device 10 may include cameras (not shown) and a microphone (not shown). The applications stored in the DC device 10 may cause the DC device 10 to perform the functions described herein for the DC device 10 and for the LDC system 12, as well as for any other systems (not shown) and devices (not shown) that may communicate with the DC device 10. Data that may be stored in the DC device 10 includes, but is not limited to, captured biometric authentication data, enrollment data records, and any information that may be used to authenticate users.

Although the exemplary DC device 10 is a smart phone, the DC device 12 may alternatively be any device capable of at least storing data and applications, executing the applications, displaying at least one of text and images, and capturing and transmitting data. Such other devices may be portable or stationary and include, but are not limited to, a cellular phone, a tablet computer, a laptop computer, a personal computer (PC) equipped with a web camera (web cam), any type of device having wireless capabilities such as a personal digital assistant (PDA), entertainment devices, and gaming consoles. Entertainment devices include, but are not limited to, televisions. Gaming consoles include, but are not limited to, Xbox 360 and Nintendo Wii.

The DC device 10 is configured to communicate with the LDC system 12, other systems (not shown), and devices (not shown) over a communications network 18. The communications network 18 is a 4G communications network. Alternatively, the communications network 18 may be any wireless network including, but not limited to, 3G, Wi-Fi, Global System for Mobile (GSM), Enhanced Data for GSM Evolution (EDGE), and any combination of a local area network (LAN), a wide area network (WAN) and the Internet. The network 18 may also be any type of wired network. Moreover, the DC device 10 is configured to conduct wireless communications such as cellular telephone calls and to wirelessly access the Internet over the network 18.

The DC device 10 may be used to capture authentication data and to process the captured authentication data. Moreover, the DC device 10 may determine user liveness based on captured authentication data or processed authentication data. The DC device 10 may determine whether or not a user is live in any manner. For example, the DC device 10 may determine user liveness by detecting eye blinks in the captured or processed authentication data. The DC device 10 may also authenticate user identities during authentication transactions based on the captured or processed authentication data.

Alternatively, the DC device 10 may transmit captured authentication data to the LDC system 12 for use in conducting authentication transactions and determining whether or not a user is live. The DC device 10 may also process captured authentication data prior to transmitting it to the LDC system 12. For example, the DC device 10 may create a biometric template from captured authentication data and then transmit the biometric template to the LDC system 12. Any number of DC devices 10, that are each associated with a same or different user, may communicate with the LDC system 12.

The LDC system 12 includes components such as, but not limited to, a web server, a database server, an application server, a directory server and a disk storage unit that may be used to store any kind of data. The disk storage unit may store at least one database such as, but not limited to, an authentication database. The application server stores applications therein that cause the LDC system 12 to perform the functions described herein. The LDC system 12 also includes a database management server and an authentication server. The database management server may be used to facilitate transferring data to and from the disk storage device. The authentication server may perform matching of any feature or information associated with users to authenticate the identity of users as described herein. The LDC system 14 is also configured to communicate with the DC device 10, other systems (not shown), and devices (not shown) over the network 18. Other systems (not shown) that the LDC system 12 and the DC device 10 may communicate with include computer systems of service providers such as, but not limited to, financial institutions, medical facilities, national security agencies, and merchants. Other devices that the LDC system 12 and the DC device 10 may communicate with over the network 18 include, but are not limited to, smart phones, tablet computers, laptop computers, personal computers and cellular phones.

The authentication database may store at least authentication data of each of a plurality of users in enrollment data records. The authentication data may be any kind of information that may be used to authenticate users such as, but not limited to, Global Positioning System (GPS) coordinates, pass-phrases, biometric authentication data, and any combination thereof. Biometric authentication data may correspond to any biometric characteristic desired to be used as a basis of authentication such as, but not limited to, voice, face, finger, iris, palm, and electrocardiogram, and any combination of voice, face, finger, iris, palm, and electrocardiogram. The biometric authentication data may take any form such as, but not limited to, audio recordings, photographic images, and video.

The enrollment data record of each authorized user includes data such as, but not limited to, enrollment biometric data, enrollment biometric templates, and personal data of the user. The enrollment biometric data is raw biometric data obtained from the user during enrollment in the LDC system 12. The enrollment biometric data for each user is processed during enrollment to generate at least one enrollment biometric template, for each respective user, which may be used to conduct authentication transactions. The enrollment biometric data may also be used to conduct authentication transactions. Personal data includes any demographic information regarding a user including, but not limited to, a user's name, gender, age, date-of-birth, address, citizenship and marital status. Each enrollment data record may also include any kind of data that may be used to authenticate the identity of users.

Although the biometric authentication data is described herein as being obtained from each user during enrollment in the LDC system 12, the biometric authentication data may be obtained by other methods such as, but not limited to, automatically reading or extracting them from identity documents or from legacy databases included in other computer systems. Likewise, biometric templates corresponding to the biometric authentication data may be obtained by other methods such as, but not limited to, automatically reading or extracting the biometric templates from identity documents or from legacy databases included in other computer systems.

Templates corresponding to desired biometric authentication data may be obtained in addition to, or instead of, the desired biometric data itself. Such other legacy database systems include, but are not limited to, systems associated with corporate and governmental personnel records, motor vehicle administrations, social security administrations, welfare system administrations, financial institutions and health care providers. Such identity documents include, but are not limited to, passports and driver's licenses. By extracting desired biometric authentication data or biometric templates from a legacy database or identity document, and storing the extracted data in the LDC system 12, user authentication data may be provided during enrollment therein without the user having to directly provide authentication data.

The LDC system 12 may also store configurable authentication policies, some of which may be used to determine data that is to be captured or obtained from users during enrollment in the LDC system 12, and others which may be used to determine an authentication data requirement. The authentication data requirement is the authentication data desired to be captured from users during authentication transactions. The authentication data requirement may be any type of authentication data, or any combination of the same or different types of authentication data and may be determined in any manner.

The LDC system 10 may also determine user liveness based on captured authentication data or processed authentication data in any manner. For example, the LDC device 12 may determine user liveness by detecting eye blinks in the captured or processed authentication data.

The DC device 10 and the LDC system 12, respectively, each include a processor (not shown) and a memory (not shown). It should be understood that, as used herein, the term processor is not limited to just those integrated circuits referred to in the art as a processor, but broadly refers to a computer, an application specific integrated circuit, and any other programmable circuit. It should be understood that the processors execute instructions, or computer programs, stored in the respective memories (not shown) of the DC device 10 and the LDC system 12. The above examples are exemplary only, and are thus not intended to limit in any way the definition and/or meaning of the term "processor."

The respective memories (not shown) in the DC device 10 and the LDC system 12 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like.

Each of the memories (not shown) can be a computer-readable recording medium used to store data, respectively, in the DC device 10 and the LDC system 12. Moreover, each of the respective memories (not shown) can be a computer-readable recording medium used to store computer programs or executable instructions that are executed, respectively, by the DC device 10 and the LDC system 12. Furthermore, the memories (not shown) may include smart cards, SIMs or any other medium from which a computing device can read computer programs or executable instructions. As used herein, the term "computer program" is intended to encompass an executable program that exists permanently or temporarily on any computer-readable recordable medium that causes the computer or computer processor to execute the program and thus causes the computer to perform a function. Applications as described herein are computer programs.

Figure 2:
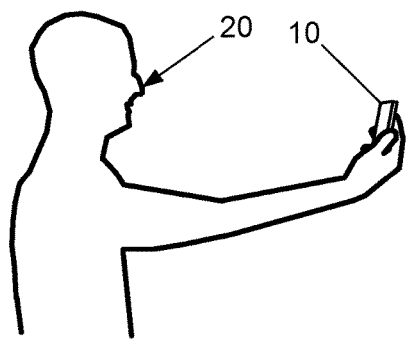
FIG. 2 is a side view of a user capturing authentication data from his self with the data capture device.

FIG. 2 is a side view of a user 20 capturing authentication data from his self with the DC device 10. Specifically, the DC device 10 and the user 20 are positioned relative to each other such that the DC device 10 may capture authentication data from the user 20. The DC device 10 may determine whether or not the user is live while capturing the authentication data or after capturing the authentication data. The DC device 10 is associated with at least one user who may be the person offering authentication data for capture. Instead of the user operating the DC device to capture authentication data from his self, another person may alternatively operate the DC device 10 to capture authentication data from the user 20.

Figure 3:
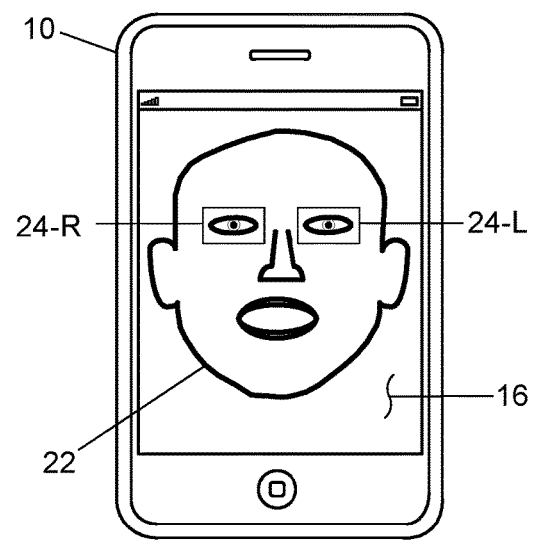
FIG. 3 is an enlarged plan view of the data capture device shown in FIG. 2, displaying an image of the user.

FIG. 3 is an enlarged plan view of the DC device 10 shown in FIG. 2, displaying a facial image 22 of the user 20 on the screen 16. The image 22 may be captured by the DC device 10 as authentication data in the form of a video. An exemplary area 24-R of the image 22 includes the right eye and the area around the right eye. The right eye is centered within the area 24-R. Another exemplary area 24-L of the image 22 includes the left eye and the area around the left eye. The left eye is centered within the area 24-L. The areas 24-R and 24-L are regions of interest that each includes pixels that describe the eye and the area of the image 22 surrounding the eye. The regions of interest 24-R, 24-L are established for each frame in the video. The regions of interest 24-R, 24-L are rectangular and are the same size. Alternatively, the regions of interest 24-R, 24-L may be any shape that facilitates determining the liveness of users as described herein. For example, the regions of interest 24-R, 24-L may be elliptical.

Figure 4:
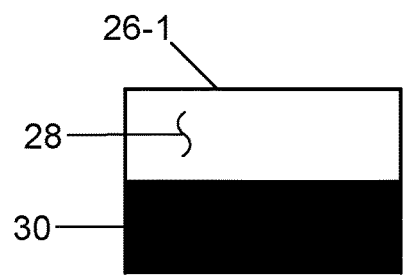
FIG. 4 is a diagram illustrating an exemplary detection window that may be used for calculating feature values.

FIG. 4 is a diagram illustrating an exemplary detection window 26-1 that may be used for calculating feature values for each frame included in captured authentication data. The detection window 26-1 is rectangular and includes two equal subareas, a first rectangular subarea 28 and a second rectangular subarea 30. The first rectangular area 28 forms a top half of the detection window 26-1 and the second rectangular area 30 forms a bottom half of the detection window 26-1. The second rectangular area 30 is shaded to facilitate distinguishing between the first and second areas. The arrangement of the rectangular areas 28, 30 within the window 26-1 determines the type of detection window. The subareas 28, 30 are in a type I arrangement. Thus, the window 26-1 is a type I detection window. The detection window 26-1 may be positioned over a region of interest 24-R, 24-L such that each subarea 28, 30 defines a group of pixels that may be used to calculate a feature value for the detection window position.

Figure 5:
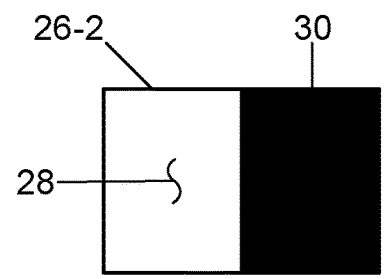
FIG. 5 is a diagram illustrating an alternative exemplary detection window.

FIG. 5 is a diagram illustrating an alternative exemplary detection window 26-2 similar to the detection window 26-1 shown in FIG. 4. However, the first rectangular subarea 28 forms a left half of the detection window 26-2 and the second rectangular subarea 30 forms a right half of the detection window 26-2. The first 28 and second 30 rectangular subareas are equal. The arrangement of the subareas 28, 30 within the window 26-2 is a type II arrangement. Thus, the window 26-2 is a type II detection window.

Figure 6:
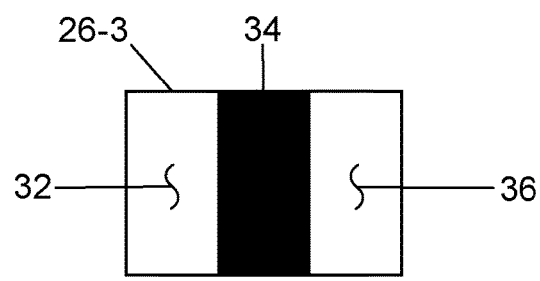
FIG. 6 is a diagram illustrating another alternative exemplary detection window.

FIG. 6 is a diagram illustrating another alternative exemplary detection window 26-3 similar to the detection window 26-1 shown in FIG. 4. However, the detection window 26-3 includes three equal rectangular subareas, a first subarea 32, a second subarea 34 and a third subarea 36. The second subarea 34 is shaded to facilitate distinguishing the three subareas from each other. The non-shaded areas 32 and 36 may be combined to form a composite subarea. Thus, when the detection window 26-3 is positioned over a region of interest 24-R, 24-L, rectangular areas 32 and 36 may define a composite pixel group. The arrangement of the three rectangular sub areas 32, 34, 36 is a type III arrangement. Thus, the window 26-3 is a type III detection window.

Figure 7:
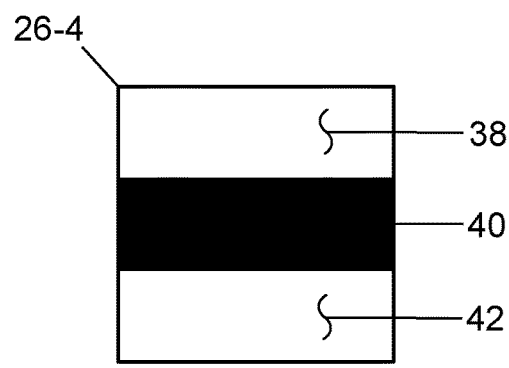
FIG. 7 is a diagram illustrating yet another alternative exemplary detection window.

FIG. 7 is a diagram illustrating an alternative exemplary detection window 26-4. The alternative detection window 26-4 is square and includes three equal rectangular subareas, a first subarea 38, a second subarea 40, and a third subarea 42. The first subarea 38 forms a top third of the window 26-4, the second rectangular subarea 40 forms a middle third of the window 26-4, and the third rectangular subarea 42 forms a bottom third of the window 26-4. The second subarea 40 is shaded to facilitate distinguishing the three subareas from each other. The non-shaded subareas 38 and 42 may be combined to form a composite subarea such that when the window 26-4 is positioned over a region of interest 24-R, 24-L, the rectangular subareas 38 and 42 may define a composite pixel group. The arrangement of the three rectangular subareas 38, 40, 42 is a type IV arrangement. Thus, the window 26-4 is a type IV detection window.

Figure 8:
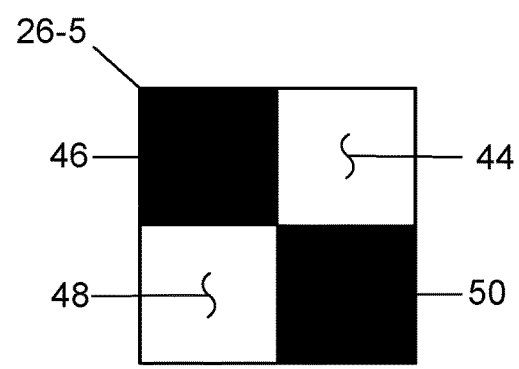
FIG. 8 is a diagram illustrating another alternative exemplary detection window.

FIG. 8 is a diagram illustrating another alternative exemplary detection window 26-5 similar to the detection window 26-4 shown in FIG. 7. However, the detection window 26-5 includes four equal square subareas, a first subarea 44, a second subarea 46, a third subarea 48, and a fourth subarea 50. The shaded subareas 46 and 50 may be combined to form a first composite subarea, and the subareas 44 and 48 may be combined to form a second composite subarea, such that when the window 26-5 is positioned over a frame included in captured authentication data the subareas 46 and 50, and the subareas 44 and 48, define respective composite pixel groups.

Although the detection windows 26-1 to 26-3 are rectangular, and the detection windows 26-4 and 26-5 are square, the detection windows 26-1 to 26-5 may alternatively be any shape that facilitates calculating feature values such as, but not limited to, elliptical. Moreover, the detection windows 26-1 to 26-5 may be any size that facilitates calculating feature values. Furthermore, the subareas 28, 30, 32, 34, 36, 38, 40, 42, 44, 46, 48, and 50 may alternatively be any shape and size that facilitates calculating feature values. Additionally, it should be understood that many different types of detection window may be provided in addition to types I-V described herein. Such other types of detection windows may include any number of the same or differently shaped subareas. The detection windows 26-1 to 26-5, as well as any other types of detection windows, may be stored in the DC device 10, the LDC system 12, or any system (not shown) or device (not shown) that communicates with the DC device 10 over the network 18.

FIG. 9 is an enlarged plan view of the exemplary region of interest 24-R including the exemplary detection window 26-1. The region of interest 24-R includes biometric data that was not captured during an authentication transaction. A two-dimensional Cartesian coordinate system having X and Y-axes is associated with the region of interest 24-R. The origin (0,0) of the Cartesian coordinate system is coincident with an upper left hand corner of the region of interest 24-R. Alternatively, the origin may be coincident with any corner of the region of interest 24-R.

The detection window 26-1 is positioned in an upper left hand corner of the region of interest 24-R and has an area smaller than the region of interest 24-R. The detection window 26-1 may be incrementally moved over the entire region of interest, horizontally and vertically, to occupy many different incremental positions within the entire region of interest 24-R. The X and Y coordinates for the upper left hand corner of the detection window are calculated for each incremental position. Alternatively, the X and Y coordinates for any corner of the detection window may be calculated, or the coordinates of the detection window center point may be calculated.

Generally, the window is incrementally moved, in the positive direction along the X-axis, from an upper left corner of the region of interest 24-R to an upper right corner of the region of interest 24-R. After moving the window by one increment in the positive direction along the Y-axis, the window is incrementally moved, in the negative direction along the X-axis, to the left side of the region of interest 24-R. The region of interest 24-R is thus incrementally moved over the entire region of interest 24-R. The increment is a single pixel. However, the increment may alternatively be any number of pixels that facilitates determining the liveness of users as described herein. The detection window 26-1 is located within the region of interest 24-R while being incrementally positioned.

At each different incremental position, the subareas 28 and 30 define groups of pixels, within the region of interest 24-R, that are to be used for calculating a feature value for each respective incremental position. More specifically, after moving the window 26-1 into an incremental position, the pixels within the first 28 and second 30 rectangular subareas, respectively, are identified. The pixels within the first subarea 28 constitute a first pixel group and the pixels within the second subarea 30 constitute a second pixel group. Each pixel has an intensity value. The intensity values of the pixels in the first pixel group are averaged to calculate a first average pixel value, and the intensity values of the pixels in the second pixel group are averaged to calculate a second average pixel value. The feature value for the incremental position is calculated as the difference between the first and second average pixel values. The calculated feature value and the X and Y coordinates of the window position are stored in the DC device 10, the LDC system 12, or any system (not shown) or device (not shown) that communicates over the network 18. After storing the calculated feature value and corresponding window coordinates, the window is incrementally moved into a new position and the feature value and corresponding window coordinates are determined for the new position.

The detection windows 26-2, 26-3, 26-4, 26-5 are similarly incrementally moved over the entire region of interest and a feature value and corresponding window coordinates are determined for each position of the windows 26-2, 26-3, 26-4, 26-5. However, it should be appreciated that the detection windows may alternatively be incrementally moved over the entire region of interest in any manner that facilitates calculating feature values as described herein. Moreover, it should be understood that different sized detection windows of the same or different type may additionally, or alternatively, be incrementally moved over the entire region of interest. For example, two different sized type I detection windows as well as two different sized detection windows of a type different that types I to V, may additionally, or alternatively, be moved over the entire region of interest. Thus, it should be understood that many different sized windows of the same type and of different types may be moved over the region of interest in any manner that facilitates calculating feature values as described herein.

The pixels of image 22 included in each region of interest 24-L, 24-R are processed identically to calculate feature values. However, the pixels for one of the eyes may be flipped prior to calculating the feature values for that eye.

FIG. 10 is a plan view of the exemplary region of interest 24-L including an interior eye point 52, an exterior eye point 54, and a centerline 56 passing through the iris center point. Prior to calculating the feature values for the frame including the region of interest 24-L, the image 22 may be flipped about the centerline 56 such that the interior eye point 52 becomes the exterior eye point, and the exterior eye point 54 becomes the interior eye point. Doing so facilitates faster and more efficient pixel processing when calculating feature values, and results in time and cost savings. When the region of interest 24-L is flipped about the centerline 56, the region of interest 24-R is not flipped. Alternatively, when the region of interest 24-R is flipped prior to calculating feature values, the region of interest 24-L is not flipped.

FIG. 11 is a plan view of the exemplary region of interest 24-L shown flipped about the centerline 56.

After calculating a feature value and coordinates for each incremental position of the detection windows 26-1 to 26-5, a vector is created for the frame. A vector is created for each frame included in the captured biometric data. After creating vectors for all of the frames included in the captured biometric data, the vectors are processed by an algorithm which creates a first tree-based model. For example, the algorithm may create a random forest model. By virtue of creating the first tree-based model, the algorithm automatically determines, or judges, which window types, sizes, and positions are most relevant to determining an eye openness measure for the frame.

FIG. 12 is a diagram illustrating an exemplary look-up table 58 that includes information regarding combinations of window type, window size, and window position deemed most relevant to determining eye openness measures for frames. The window size is given in width and height while the position is given in X, Y coordinates. The X, Y coordinates are those coordinates calculated while moving the detection windows 26-1 to 26-5 incrementally over the region of interest 24-R. The upper left corner of each detection window is positioned, on the region of interest, at the corresponding X, Y coordinates listed in the table 58. The table 58 may be stored in the DC device 10, the AC system 12, or any other device (not shown) or system (not shown) that communicates over the network 18. The table 58 includes twenty-two different combinations of window type, window size, and window position. Alternatively, the table 58 may include any number of different combinations of window type, window size, and window position.

The window types that may be included in table 58 include types I-V. More specifically, table 58 includes four combinations for each of type I, II, and III windows, and five combinations for each of type IV and V windows. However, it should be understood that if a window type and all the associated size and position combinations are not deemed to be most relevant, then a window type may not be included in the table 58. For example, when none of the size and position combinations for a type II detection window are deemed most relevant, the type II detection window would not be included in the table 58. The number of occurrences of each window type within the table 58 is generally different.

During authentication transactions, after capturing authentication data from a user, the regions of interest 24-R and 24-L are identified and feature values are calculated for each frame in the captured authentication data. A feature value is calculated for each combination of window type, size, and position as listed in the table 58. More specifically, each detection window is positioned on the region of interest at the corresponding coordinates listed in table 58, and a feature value is calculated for each window, size, and position combination as listed in table 58.

The information shown in FIGS. 13-17 is substantially the same information shown in FIG. 9 as described in more detail below. As such, features illustrated in FIGS. 13-17 that are identical to features illustrated in FIG. 9, are identified using the same reference numerals used in FIG. 9.

Figure 13:
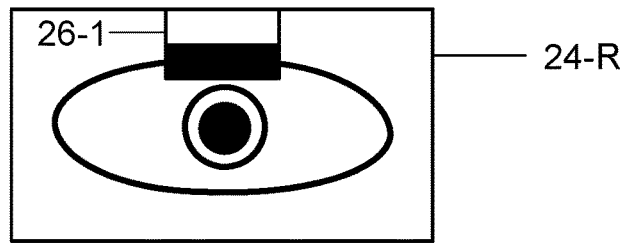
FIG. 13 is an enlarged plan view of an exemplary region of interest including a type I detection window.

FIG. 13 is an enlarged plan view of authentication data, within the region of interest 24-R, captured during an authentication transaction, that includes an exemplary type I detection window 26-1 positioned over the region 24-R in accordance with table 58. A feature value is calculated for the exemplary type I detection window position. The region of interest 24-R is for a single frame included in the captured authentication data.

Figure 14:
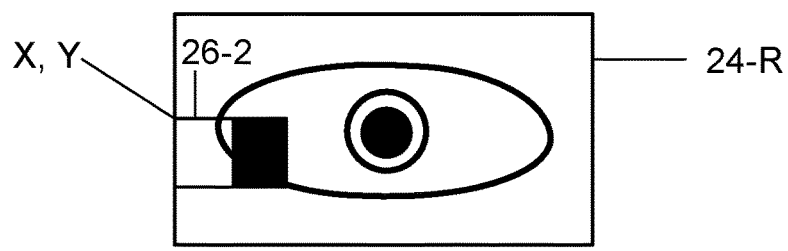
FIG. 14 is an enlarged plan view of an exemplary region of interest including a type II detection window.

FIG. 14 is an enlarged plan view of authentication data, within the region of interest 24-R, captured during an authentication transaction, that includes an exemplary type II detection window 26-2 positioned over the region 24-R in accordance with table 58. The X, Y coordinates of the upper left corner of the window 26-2 are used to position the window 26-2 over the region of interest 24-R. A feature value is calculated for the exemplary type II detection window position. The region of interest 24-R is for the same frame shown in FIG. 13.

Figure 15:
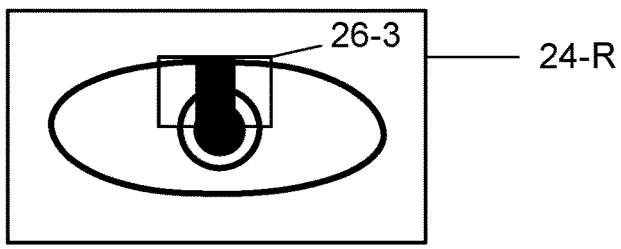
FIG. 15 is an enlarged plan view of an exemplary region of interest including a type III detection window.

FIG. 15 is an enlarged plan view of authentication data, within the region of interest 24-R, captured during an authentication transaction, that includes an exemplary type III detection window 26-3 positioned over the region 24-R in accordance with table 58. A feature value is calculated for the exemplary type III detection window position. The region of interest 24-R is for the same frame shown in FIG. 13.

Figure 16:
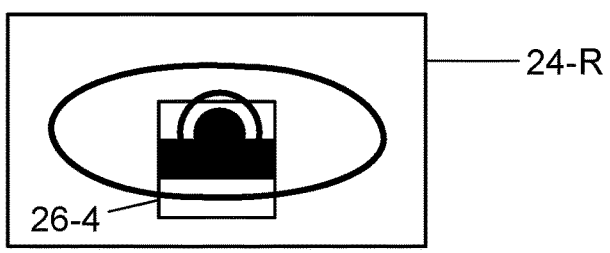
FIG. 16 is an enlarged plan view of an exemplary region of interest including a type IV detection window.

FIG. 16 is an enlarged plan view of authentication data, within the region of interest 24-R, captured during an authentication transaction, that includes an exemplary type IV detection window 26-4 positioned over the region 24-R in accordance with table 58. A feature value is calculated for the exemplary type IV detection window position. The region of interest 24-R is for the same frame shown in FIG. 13.

Figure 17:
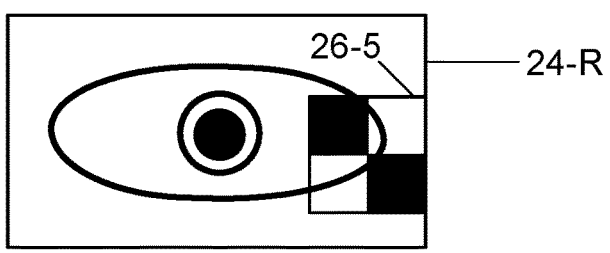
FIG. 17 is an enlarged plan view of an exemplary region of interest including a type V detection window.

FIG. 17 is an enlarged plan view of authentication data, within the region of interest 24-R, captured during an authentication transaction, that includes an exemplary type V detection window 26-5 positioned over the region 24-R in accordance with table 58. A feature value is calculated for the exemplary type V detection window position. The region of interest 24-R is for the same frame shown in FIG. 13.

The feature values calculated for the combinations listed in table 58 are used to calculate an eye openness measure for the frame. More specifically, the calculated feature values are processed by a first tree-based model which calculates an eye openness measure for the frame. The first model may be implemented to act as a regressor or the first model may be implemented to act as a classifier.

The eye openness measure is a value that varies within a range from negative one (−1) to positive one (+1) where positive one indicates that the eye is fully open and negative one indicates that the eye is fully closed. Values between positive and negative one indicate that the eye is partially open or partially closed, and may be used in a temporal analysis to determine whether the eye is opening or closing. Alternatively, the eye openness measure may vary between any range of values that facilitates determining the liveness of users. For example, the eye openness measures may alternatively vary between zero (0) and one (+1) where zero indicates the eye is fully closed and one indicates the eye is fully open; negative one (−1) and zero (0) where negative one indicates the eye is fully closed and zero indicates the eye is fully open; or zero (0) and two (+2) where zero indicates the eye is fully closed and two indicates the eye is fully open. After generating the left and right eye openness measures for a frame, the frame may be compared against other frames in a temporal analysis to determine whether or not the eyes are blinking and thus whether or not the user is live.

Figure 18:
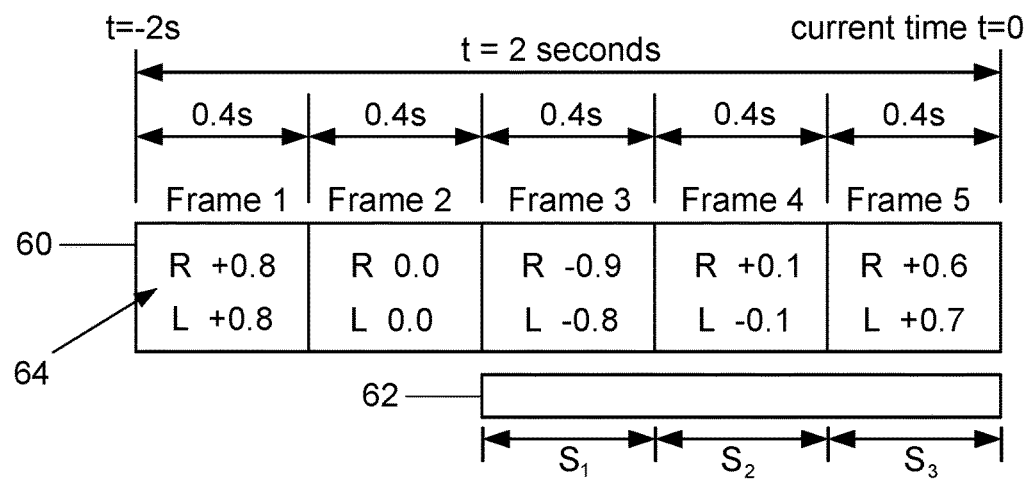
FIG. 18 is a diagram illustrating an exemplary buffer for storing eye openness measures and an exemplary temporal window.

FIG. 18 is a diagram illustrating an exemplary buffer 60 and a temporal window 62. The exemplary buffer 60 temporarily stores eye openness measures 64 and has a temporal duration of two (2) seconds. Thus, the buffer 60 stores eye openness measures calculated during a two second period immediately before the current time. The buffer 60 may be in the DC device 10, the LCD system 12, or in any system (not shown) or device (not shown) that communicates with the DC device 10 over the network 18.

The buffer 60 includes the left and right eye openness measures 64 calculated for the most recent five (5) frames. Specifically, the eye openness measures 64 calculated for frame 1 are: +0.8 and +0.8, for the left and right eyes, respectively; 0.0, 0.0 for the left and right eyes, respectively; −0.9 and −0.8 for the left and right eyes, respectively; −0.1 and +0.1 for the left and right eyes, respectively; and +0.6 and +0.7 for the left and right eyes, respectively. The left and right eye openness measures 64 calculated for each frame constitute a pair of eye openness measures. The eye openness measures 64 are used to detect eye blinks.

Although the buffer 60 includes five (5) frames, it should be understood that the number of eye openness measure pairs stored in the buffer 60 depends on the frame rate of the DC device 10. Thus, depending on the frame rate of the DC device 10, the buffer 60 may alternatively store eye openness measure pairs for more or less than five frames. For example, eye openness measure pairs for sixty frames may be stored in the buffer 60 when the frame rate is thirty frames per second. However, the buffer 60 may not be smaller than one hundred milliseconds. Moreover, the buffer 60 may not store eye openness measure pairs for less than three different frames because at least three different pairs of eye openness measures are required to accurately detect an eye blink. Although the buffer has a temporal duration of two (2) seconds, the buffer 60 may alternatively be of any temporal duration that facilitates determining eye blinks as described herein.

The position of the temporal window 62 indicates which eye openness measures 64 are to be used for calculating a confidence score. The eye openness measure pairs within the temporal window 62 are divided into three (3) temporal groups, $S_1$, $S_2$, and $S_3$. The temporal groups each include an equal number of eye openness measure pairs. Alternatively, each temporal group $S_1$, $S_2$, and $S_3$ may include more than one eye openness measure pair. Moreover, each temporal group $S_1$, $S_2$, and $S_3$ may include a same or different number of eye openness measure pairs. Temporal group $S_1$ represents the oldest eye openness measure pair 64, group $S_3$ represents the newest eye openness measure pair 64, and group $S_2$ represents the eye openness measure pair 64 calculated between the oldest and newest eye openness measure pairs.

A confidence score is a value indicating the degree of confidence calculated by statistical methods that a blink occurred within the time spanned by the temporal window 62. The confidence scores are calculated by processing the eye openness measure pairs for the temporal groups $S_1$, $S_2$, and $S_3$. More specifically, the eye openness measures are used in a series of calculations that each facilitates determining confidence scores. Such calculations include, but are not limited to: calculating an average eye openness measure value for a lone temporal group; calculating an average eye openness measure value for any combination of the temporal groups; calculating the difference between average eye openness measure values; and, calculating the variance for the eye openness measures included in all the temporal groups $S_1$, $S_2$, $S_3$.

Each calculation may be conducted with the eye openness measures included in a different temporal group, or in different combinations of temporal groups. Moreover, the same calculation may be conducted with eye openness measures included in different temporal groups. Furthermore, both eye openness measures included in a pair are used in the calculations. For example, when calculating the average eye openness measure value for temporal group $S_2$, the left and right eye openness measures for frame 3 are used. Alternatively, the left eye openness measures only, or the right eye openness measures only, may be used in a calculation.

After conducting the desired calculations, the results are combined to create a vector which is processed by a second tree-based model to calculate the confidence score for the temporal window 62 position. A first confidence score is thus calculated based on the eye openness measures included in the groups $S_1$, $S_2$, and $S_3$. The second tree-based model is built using the same type of algorithm used to build the first tree-based model. However, the second tree-based model uses different type of input data and is created such that the output is a confidence score. The second tree-based model may be implemented to act as a regressor or the second model may be implemented to act as a classifier. After computing the first confidence score, the temporal window 62 is shifted to include the next oldest eye openness measure pair.

Figure 19:
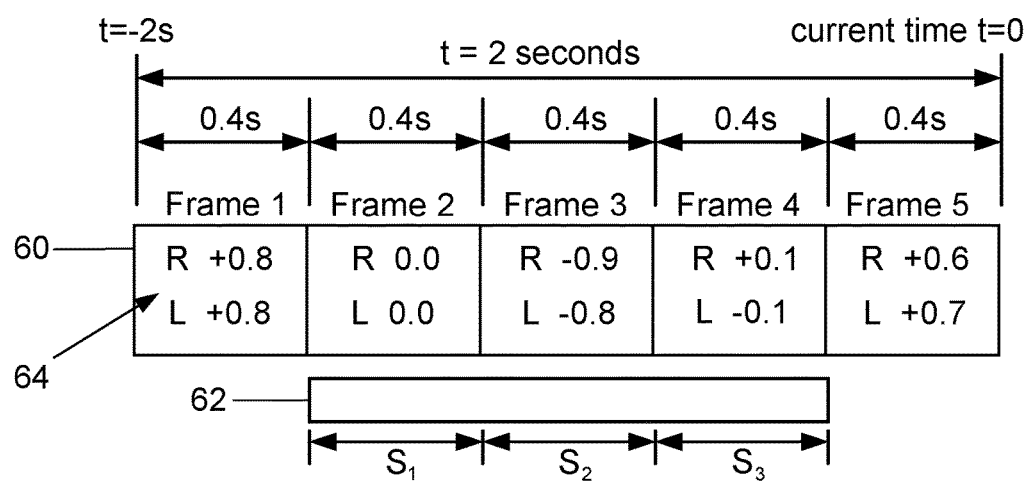
FIG. 19 is a diagram illustrating the exemplary buffer as shown in FIG. 18 in which the temporal window is shifted relative to the buffer.

FIG. 19 is a diagram illustrating the buffer 60 and the temporal window 62 as shown in FIG. 18; however, the temporal window 62 is shifted relative to the buffer 60 to include the next oldest eye openness measure pair. The next oldest eye openness measure pair includes those eye openness measures calculated for frame 2. By virtue of shifting the temporal window 62 to include the next oldest eye openness measure pair, the temporal window 62 does not include the eye openness measure pair of the newest frame, that is, frame 5. After the shift, the temporal groups $S_1$, $S_2$, and $S_3$ include the eye openness measure pairs for frames 2, 3, and 4, respectively. Thus, the eye openness measure pairs of frames 2-4 are within the temporal window 62 and are used to calculate a second confidence score using the second tree-based model. After computing the second confidence score the temporal window 62 is shifted to include the next oldest eye openness measure pair.

Figure 20:
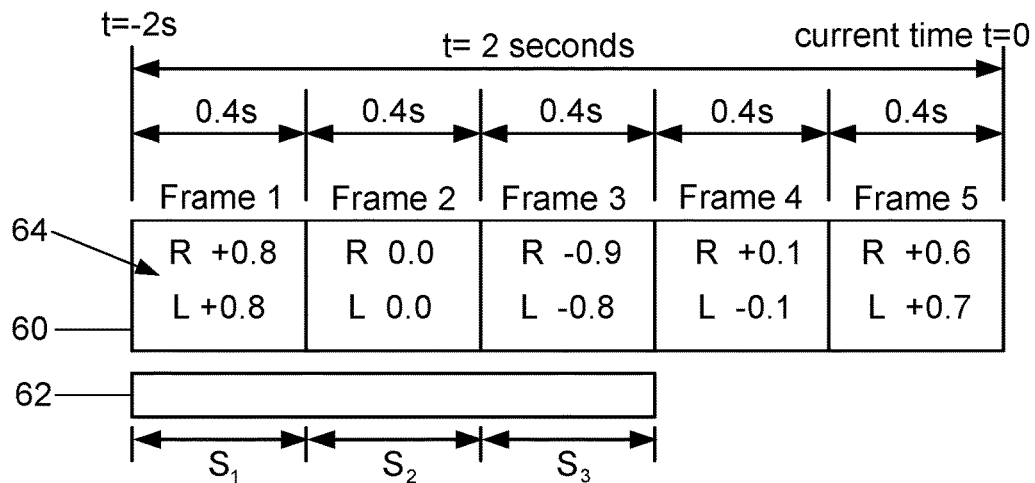
FIG. 20 is a diagram illustrating the exemplary buffer as shown in FIG. 19 in which the temporal window is shifted relative to the buffer.

FIG. 20 is a diagram illustrating the buffer 60 as shown in FIG. 19; however, the temporal window 62 is shifted relative to the buffer to include the next oldest eye openness measure pair. The next oldest eye openness measure pair includes those eye openness measures calculated for frame 1. The eye openness measures calculated for frame 1 are the oldest within the buffer 60. By virtue of shifting the temporal window 62 to include the next oldest eye openness measure pair, the temporal window 62 no longer includes the eye openness measure pair for frame 4. After the shift, the temporal groups $S_1$, $S_2$, and $S_3$ include the eye openness measure pairs of frames 1, 2, and 3, respectively. Thus, the eye openness measure pairs of frames 1-3 are within the temporal window 62 and are used to calculate a third confidence score using the second tree-based model. The temporal window 62 does not shift beyond the temporal limits of the buffer 60. Consequently, after calculating the third confidence score a new temporal window is established that has a different temporal duration than the temporal window 62.

Figure 21:
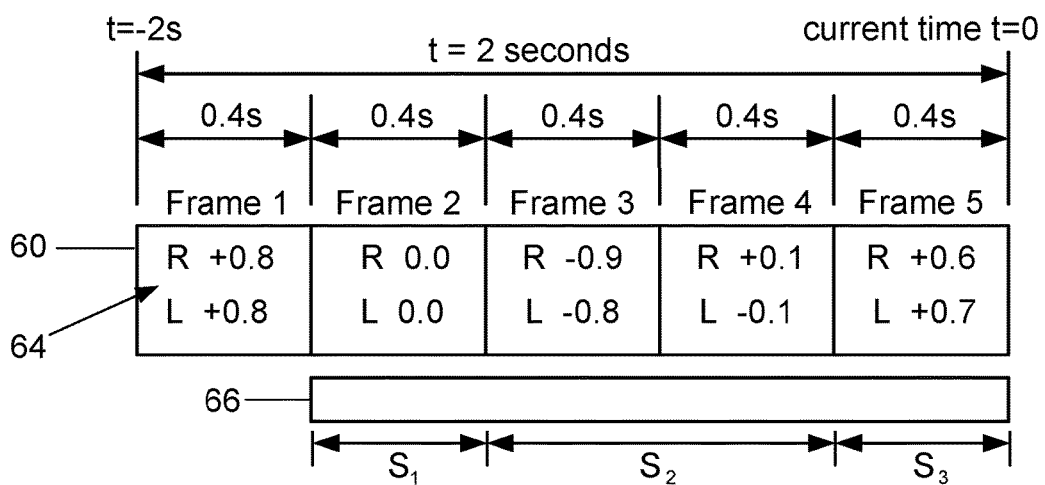
FIG. 21 is a diagram illustrating the buffer shown in FIG. 18 and an alternative exemplary temporal window.

FIG. 21 is a diagram illustrating the buffer 60 as shown in FIG. 20 and an alternative exemplary temporal window 66 created by extending the temporal window 62 to include the eye openness measure of an additional frame. The temporal window 66 is also initially positioned to extend back from the current time and includes the eye openness measure pairs calculated for frames 2 to 5. Thus, the total number of eye openness measure pairs included in the temporal window 66 is four (4). However, because the number of eye openness measure pairs within the temporal window 66 is not divisible by three (3), the eye openness measure pairs within the window 66 cannot be distributed equally between the three (3) temporal groups $S_1$, $S_2$, and $S_3$.

Instead the eye openness measure pairs are distributed unequally between the temporal groups $S_1$, $S_2$, and $S_3$. More specifically, the number of eye openness measure pairs included in groups $S_1$ and $S_3$ is determined by dividing the total number of eye openness measure pairs by three (3) and truncating the quotient to an integer. Dividing four (4) by three (3) yields a quotient of 1.33 which truncates to the integer one (1). The integer one (1) represents the number of eye openness measure pairs in temporal group $S_1$ and in temporal group $S_3$. The number of eye openness measure pairs included in group $S_2$ is the difference between the total number of pairs within the temporal window 66 and the total number of pairs included in groups $S_1$ and $S_3$. The total number of pairs included in the window 66 is four (4), and the total number of pairs included in groups $S_1$ and $S_3$ is two (2). Thus, the difference is two (2), which is the total number of eye openness measure pairs included in temporal group $S_2$. As a result, temporal groups $S_1$, $S_2$, and $S_3$ include the eye openness measure pairs for frame 2, frames 3 and 4, and frame 5, respectively. Alternatively, the number of eye openness measure pairs included in each temporal group may be determined in any manner that facilitates calculating confidence scores as described herein. Moreover, any number of eye openness measure pairs may be included in each temporal group that facilitates detecting eye blinks as described herein.

A fourth confidence score is calculated from the eye openness measure pairs included in the temporal groups $S_1$, $S_2$, and $S_3$ using the second tree-based model. After computing the fourth confidence score, the temporal window 66 is shifted to include the next oldest eye openness measure pair.

Figure 22:
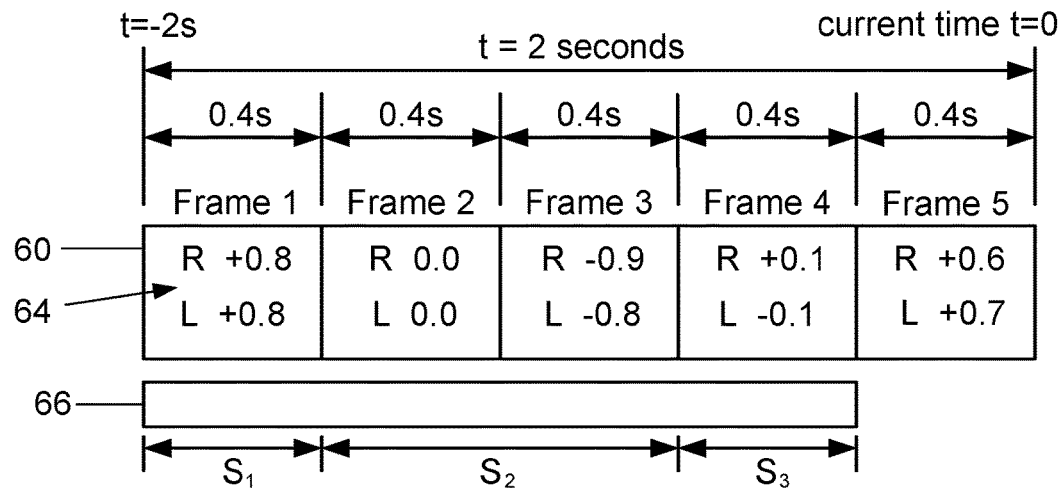
FIG. 22 is a diagram illustrating the buffer shown in FIG. 21 in which the alternative temporal window is shifted relative to the buffer.

FIG. 22 is a diagram illustrating the buffer 60 shown in FIG. 21; however, the alternative temporal window 66 is shifted relative to the buffer 60 to include the next oldest eye openness measure pair. The next oldest eye openness measure pair is the eye openness measure pair calculated for frame 1. By virtue of shifting the temporal window 66 to include the next oldest eye openness measure pair, the temporal window 66 does not include the eye openness measure pair of the newest frame, that is, frame 5. It should be understood that after shifting the temporal window 66 the eye openness measure pairs included in each temporal group $S_1$, $S_2$, and $S_3$ are calculated in the same manner as described above regarding FIG. 21. Thus, after the shift, the temporal groups $S_1$, $S_2$, and $S_3$ include the eye openness measure pairs of frame 1, frames 2 and 3, and frame 4, respectively. The eye openness measure pairs included in temporal groups $S_1$, $S_2$, and $S_3$ are used to calculate a fifth confidence score using the second tree-based model. Because the temporal window 66 cannot shift beyond the temporal limits of the buffer 60, another temporal window is created by extending the temporal window 66 to include the eye openness measure pair of an additional frame.

Figure 23:
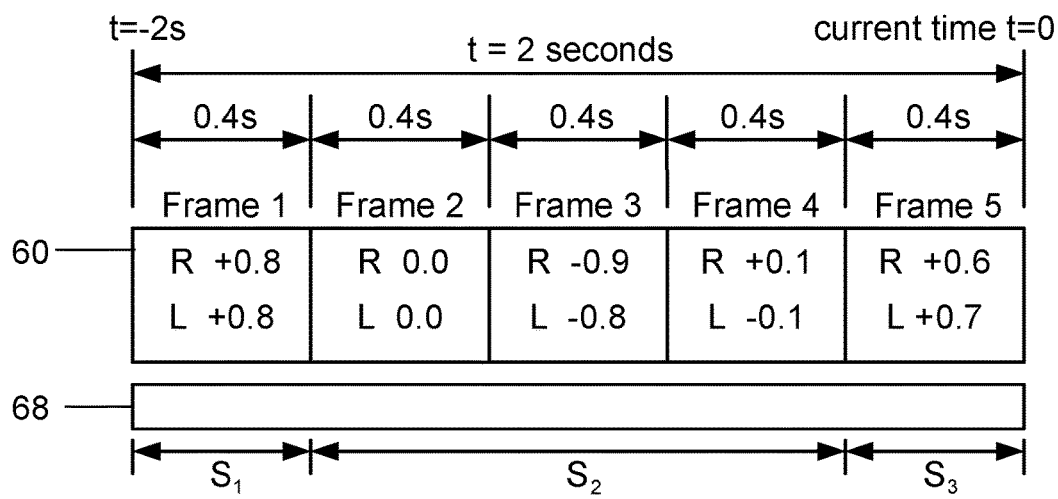
FIG. 23 is a diagram illustrating the buffer shown in FIG. 22 and another alternative exemplary temporal window.

FIG. 23 is a diagram illustrating the buffer 60 as shown in FIG. 22 and another alternative exemplary temporal window 68. The temporal window 68 is positioned to extend back from the current time. However, the temporal window 68 includes five (5) eye openness measure pairs which is not divisible by three (3). Thus, the eye openness measure pairs included in each temporal group $S_1$, $S_2$, and $S_3$ is computed as described above with regard to FIG. 21. More specifically, dividing the total number of eye openness measure pairs, five (5), by three (3) yields a quotient of 1.67 which truncates to one (1). Thus, each of the temporal groups $S_1$ and $S_3$ includes one (1) eye openness measure pair for a total of two (2) between groups $S_1$ and $S_3$. The difference between the total number of eye openness measure pairs (5) and those included in groups $S_1$ and $S_3$ is three (3). Thus, each of the temporal groups $S_1$ and $S_3$ includes one (1) eye openness measure pair and temporal group $S_2$ includes three (3) eye openness measure pairs. The eye openness measure pairs included in each temporal group are used to calculate a sixth confidence score using the second tree-based model. Because the temporal window 68 cannot shift beyond the limits of the buffer 60, the temporal window 68 is not shifted along the buffer 60 and cannot be extended to create yet another temporal window. Thus, processing of the buffer 60 is complete.

For each position of the temporal windows 62, 66, 68, the eye openness measure pairs within the respective windows are divided into three (3) groups. When the number of eye openness measure pairs within temporal respective window 62, 66, 68 is divisible by three (3), each group includes the same number of eye openness measure pairs. However, when the number of eye openness measure pairs is not divisible by three, each temporal group may include the same or a different number of eye openness measure pairs.

Figure 24:
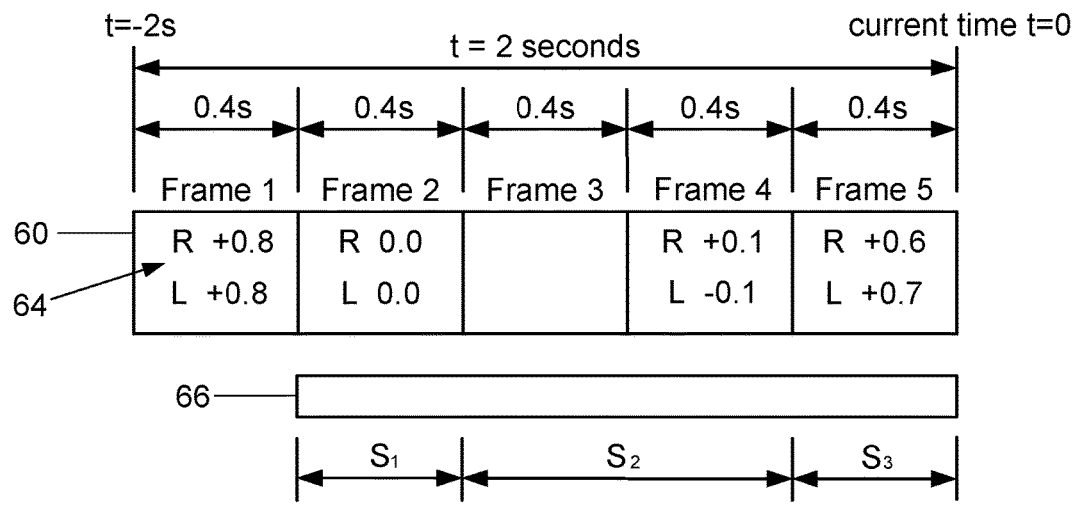
FIG. 24 is a diagram illustrating a buffer and temporal window similar to that shown in FIG. 21.
Figure 25:
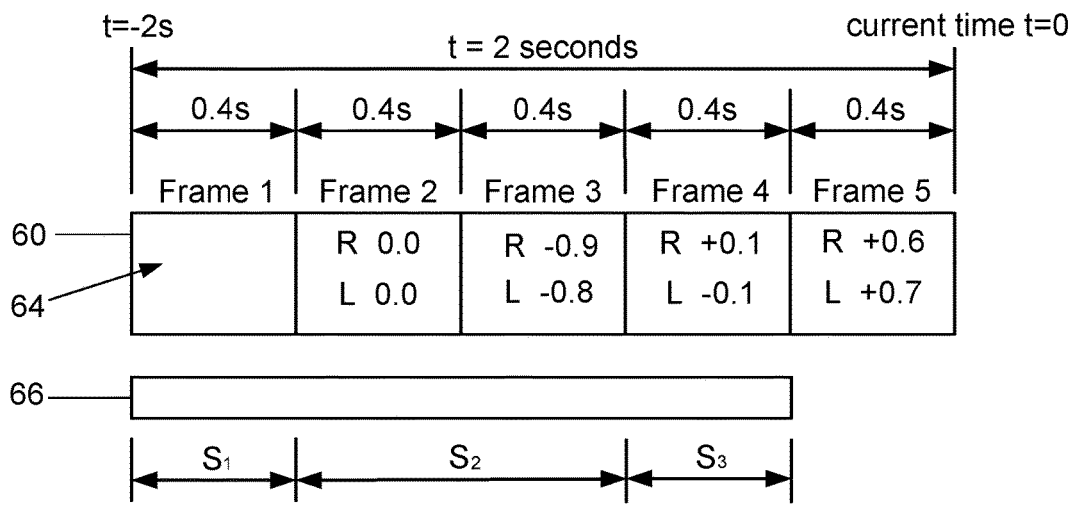
FIG. 25 is a diagram illustrating a buffer and temporal window similar to that shown in FIG. 22.

The information shown in FIGS. 24 and 25 is substantially the same information shown in FIGS. 21 and 22, respectively, as described in more detail below. As such, features illustrated in FIGS. 24 and 25 that are identical to features illustrated in FIGS. 21 and 22 are identified using the same reference numerals used in FIGS. 21 and 22.

FIG. 24 is a diagram illustrating the buffer 60 and alternative temporal window 66 as shown in FIG. 21. However, an eye openness measure pair is not provided for frame 3. An eye openness measure pair may not be provided for many reasons, for example, the user may have momentarily moved during authentication data capture such that data for the regions of interest 24-R, 24-L was not captured by the DC device 10.

Each temporal group $S_1$, $S_2$, and $S_3$ is required to include at least one eye openness measure pair because otherwise a confidence score cannot be properly calculated for the corresponding position of the temporal window 66. Although temporal group $S_2$ should include two eye openness measure pairs, the eye openness measure pair for frame 4 is adequate to calculate a proper confidence score for the position of the temporal window 66.

FIG. 25 is a diagram illustrating the buffer 60, and the temporal window 66 shifted to the next oldest eye openness measure pair, as shown in FIG. 22. However, an eye openness measure pair is not provided for frame 1. Consequently, a confidence score cannot be calculated for the position of the temporal window 66 because the temporal group $S_1$ does not include at least one eye openness measure pair. Instead, the temporal window 66 is shifted or another temporal window is generated.

Figure 26:
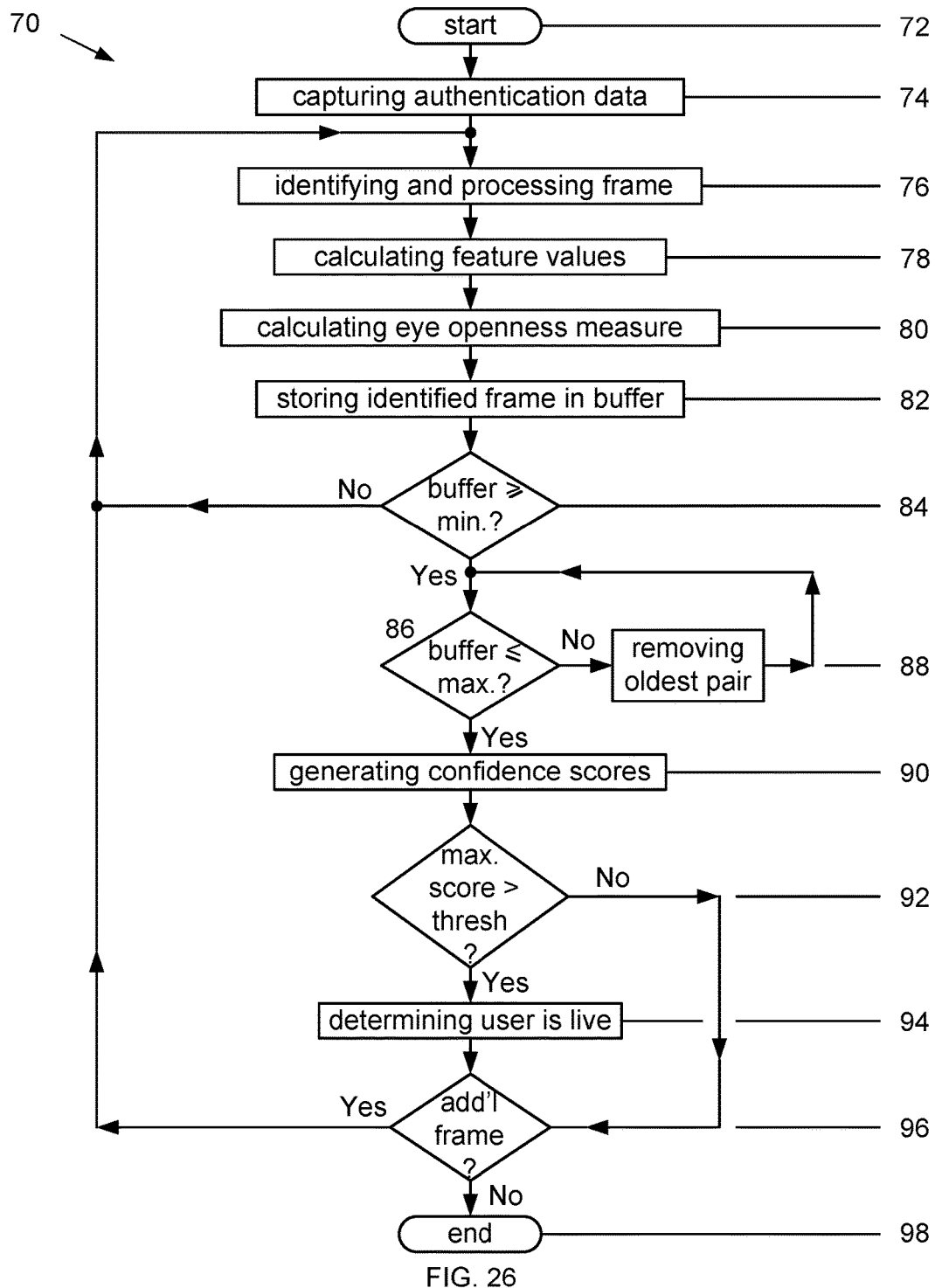
FIG. 26 is a flowchart illustrating an exemplary method for determining user liveness during authentication transactions.

FIG. 26 is a flowchart 70 illustrating an exemplary method for determining user liveness during authentication transactions. The process starts 72 with a user activating his DC device 10 and capturing facial authentication data 74 from his self with the DC device 10. Next, processing continues by identifying an initial frame 76 in the captured authentication data, recording the time stamp of the frame, detecting the eyes 76 in the frame, and determining 76 a region of interest 24-R for the right eye and another region of interest 24-L for the left eye. After determining the regions of interest, processing continues by normalizing pixels 76 of the captured authentication data, included in the regions of interest, to have a 10×16 resolution and calculating feature values 78 for the region of interest. Feature values are calculated for both the left and right regions of interest in the same manner, so feature value calculation is described herein for one region of interest, the region of interest 24-R. However, it should be understood that the region of interest 24-L is flipped about the centerline of its iris prior to calculating feature values.

After normalizing the pixels, processing continues by calculating a feature value 78 for each combination of window type, window size, and window position listed in table 58, and calculating the eye openness measure 80 for the frame using the second tree-based model. After calculating the eye openness measure 80, processing continues by storing 82 the eye openness measures in the buffer 60 and determining 84 whether the buffer 60 is greater than or equal to the minimum size. If the buffer 60 is not equal to or greater than the minimum size, processing continues by identifying 76 and processing 76 another frame. Otherwise, processing continues by determining 86 whether the buffer 60 is less than or equal to the maximum buffer size. If the buffer 60 is not less than or equal to the maximum size 86, processing continues by removing 88 the eye openness measure pair for the oldest frame from the buffer 60, and determining 86 whether the buffer 60 is less than or equal to the maximum buffer size. When the buffer is less than or equal to the maximum buffer size, processing continues by calculating 90 the confidence scores for the eye openness measures in the buffer 60, determining which confidence score is the maximum confidence score, and comparing 92 the maximum confidence score against a threshold score.

When the maximum confidence score is equal to or greater than the threshold score 92, processing continues by detecting 94 an eye blink and determining that the user is therefore live 94. Next, processing continues by erasing the buffer 60, and determining 96 whether there is an additional frame in the captured biometric data. If so, processing continues by identifying 76 and processing 76 the additional frame. Otherwise, when the maximum confidence score is not greater than the threshold score 92, processing continues by determining 96 that an eye blink did not occur and determining whether there is an additional frame in the captured biometric data. If so, processing continues by identifying 76 and processing 76 the additional frame. When an additional frame is not included in the captured biometric data, processing ends 98.

In each embodiment, the above-described methods and systems for determining user liveness during authentication transactions facilitates accurately verifying the physical presence of users during authentication transactions and facilitates increasing the trustworthiness of authentication transaction results. More specifically, feature values for a frame included in captured authentication data are calculated and are used to calculate eye openness measures for the frame. The eye openness measures are each stored in a buffer of eye openness measures. The eye openness measures in the buffer are used to calculate a confidence score for the frame. After determining a maximum confidence score, the maximum confidence score is compared against a threshold score. When the maximum confidence score is equal to or greater than the threshold score, an eye blink is detected and the user is determined to be live. As a result, the physical presence of a user during an authentication transaction can be accurately verified. Furthermore, the trustworthiness of authentication transaction results are facilitated to be increased and costs associated with successful spoofing are facilitated to be reduced.

In each embodiment, the above-described methods and systems detect natural eye blinks in addition to eye blinks generated in response to a challenge request. Generating eye blinks in response to a challenge request is typically viewed as intrusive and inconvenient by users. Consequently, detecting natural eye blinks as described herein facilitates reducing the intrusiveness and inconvenience, and may thus enable reducing the number of authentication transactions requiring eye blinks in response to challenge requests. Natural eye blinks produce eye openness measures that are generally different than eye openness measures produced by imposters attempting to spoof a system. If calculated eye openness measures do not resemble the eye openness measures of a natural blink, the user may be discovered to be an imposter.

Exemplary embodiments of methods for determining user liveness during authentication transactions are described above in detail. The methods are not limited to use with the specific authentication computer systems described herein, but rather, the methods can be utilized independently and separately from other computer components described herein. For example, the methods for determining the liveness of users described herein may be implemented by most computer systems, and may be used for a wide range of authentication scenarios, including remotely conducting a payment transaction over the Internet. Moreover, the invention is not limited to the embodiments of the methods described above in detail. Rather, other variations of the methods may be utilized within the spirit and scope of the claims.

While the invention has been described in terms of various specific embodiments, those skilled in the art will recognize that the invention can be practiced with modification within the spirit and scope of the claims.

What is claimed is:

1. A method for determining detection windows and window positions comprising:
   for at least one frame in a video of captured biometric data, incrementally moving, by a processor, at least one detection window type over a region of interest to occupy different positions within the region of interest, the region of interest including the captured biometric data;
   calculating a feature value for each position;
   creating a vector for each frame included in the at least one frame from the feature values calculated for the respective frame; and
   processing the vectors using an algorithm to determine information regarding combinations of detection window type, size, and position to be used for calculating eye openness measures during authentication transactions.

2. A method for determining detection windows and window positions in accordance with claim 1, said calculating a feature value step comprising:
   defining different pixel groups with the at least one detection window type, the pixel groups being within the region of interest;
   calculating an average value for each pixel group; and
   calculating the feature value as the difference between the average values.

3. A method for determining detection windows and window positions in accordance with claim 1, the processor being included in a live-ness detection computer system.

4. An apparatus for determining detection windows and window positions comprising:
   a processor; and
   a memory for storing authentication data, said apparatus being associated with a network and said memory being in communication with said processor and having instructions stored thereon which, when executed by said processor, cause said processor to:
   for at least one frame in a video of captured biometric data, incrementally move at least one detection window type over a region of interest to occupy different positions within the region of interest, the region of interest including the captured biometric data;
   calculate a feature value for each position;
   create a vector for each frame included in the at least one frame from the feature values calculated for the respective frame; and
   process the vectors using an algorithm to determine information regarding combinations of detection window type, size, and position to be used for calculating eye openness measures during authentication transactions.

5. An apparatus in accordance with claim 4, wherein the instructions for causing the processor to calculate a feature value for each position, when read and executed by said processor, further cause said processor to:
   define different pixel groups with the at least one detection window type, the pixel groups being within the region of interest;
   calculate an average value for each pixel group; and
   calculate the feature value as the difference between the average values.

6. An apparatus in accordance with claim 4, said apparatus being a liveness detection computer system.

7. A non-transitory computer-readable recording medium included in a computing device, the recording medium having a computer program stored thereon for determining detection windows and window positions, the computer program being comprised of instructions, which when read and executed by the computing device, cause the computing device to:
   for at least one frame in a video of captured biometric data, incrementally move at least one detection window type over a region of interest to occupy different positions within the region of interest, the region of interest including the captured biometric data;
   calculate a feature value for each position;
   create a vector for each frame included in the at least one frame from the feature values calculated for the respective frame;
   process the vectors using an algorithm to determine information regarding combinations of detection window type, size, and position to be used for calculating eye openness measures during authentication transaction.

8. A computer program in accordance with claim 7 wherein the instructions for causing the computing device to calculate a feature value for each position, when read and executed by said computing device, further cause said computing device to:
   define different pixel groups with the at least one detection window type, the pixel groups being within the region of interest;
   calculate an average value for each pixel group; and
   calculate the feature value as the difference between the average values.

9. A computer program in accordance with claim 7, the computing device being a liveness detection computer system.

* * * * *